Patented June 21, 1927.

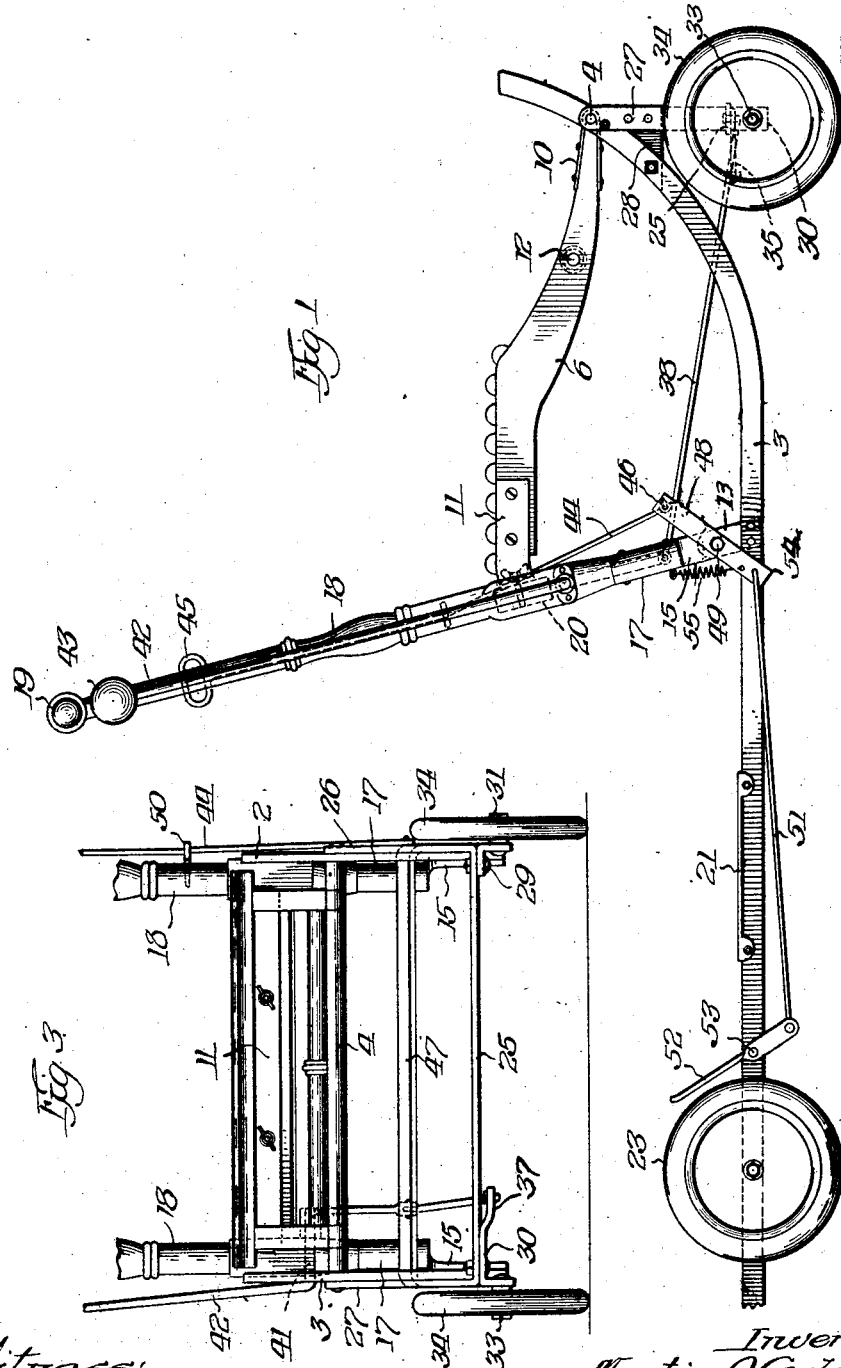

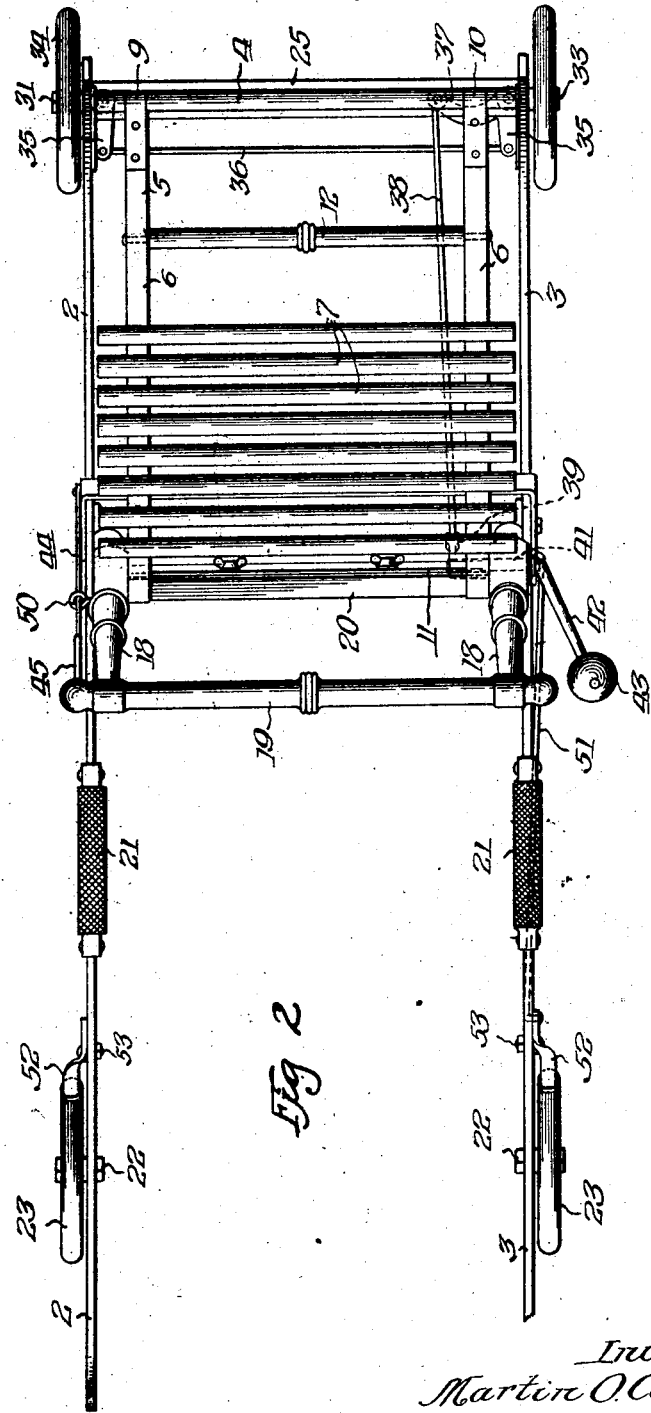

1,633,362

UNITED STATES PATENT OFFICE.

MARTIN O. CARLSON, OF CHICAGO, ILLINOIS.

PUSH SLED.

Application filed December 10, 1924. Serial No. 754,931.

This invention relates in general to sleds, and has more particular reference to a light vehicle which may be used as a sled on the snow in the winter time and as a wheeled coaster or glider when the snow or ice are gone from the ground.

The invention has for one of its main purposes the provision of a sled or coaster vehicle so constructed that it may be propelled by one foot of the rider, who may stand upright, without causing the sled or coaster to swerve sidewise or be diverted from its course by the pushing action.

Another object of the invention is to provide a combination sled and coaster upon which the rider may stand with one foot while using the other foot for propulsion, and to combine in such vehicle a steering mechanism for the vehicle when mounted upon wheels, with steering mechanism for the sled when used upon ice or snow. In this connection the vehicle is provided with a handle to which the rider may cling while standing in an upright position and to which he may hold while operating the wheel steering mechanism.

Its further object is to provide a combination push vehicle so constructed that two riders may stand in upright position and each contribute toward the propulsion of the vehicle without interference of the other and whereby one, two or more people may be carried upon a seat forward of the rider's propelling vehicle.

A still further object is to provide a vehicle of the character described having steering mechanism operative by the person propelling the vehicle when it is used as a wheeled vehicle and having a combined brake mechanism adapted to brake upon the wheels or upon the ice dependent upon the use to which the vehicle is being put.

Other objects are to provide a vehicle of the character described which will be strong and durable, economical to manufacture, one which will be light enough for the use of young children, and one which can be easily steered, readily propelled with a minimum of exertion, quickly braked and susceptible of obtaining relatively high speeds.

Many other objects together with the inherent advantages of my invention, should be readily appreciated, as it is better understood by reference to the following description and claims and from the drawings in which:

Fig. 1 is a side elevation of the vehicle constructed in accordance with my invention.

Fig. 2 is a top plan view thereof, and

Fig. 3 is a front elevation with the upper structure broken away.

The vehicle comprises two longitudinally extending and substantially parallel runners 2 and 3 curved upwardly at their forward end and connected by a transverse member 4 which serves to rigidly brace and space the runners apart. Upon the rod 4 the forward end of a seat frame comprising side members 5 and 6 and cross members or slats 7, is pivotally mounted by means of clips 9 and 10. The rear ends of the side members 5 and 6 are connected together by a metal yoke 11 overlapping the outer sides of the members 5 and 6 and is secured thereto by means of screws, bolts or the like. A spacing bar 12 may be disposed between the side members 5 and 6 to additionally brace them and afford a footrest for a passenger or passengers seated upon the transverse slats 7.

Each runner intermediate its ends is equipped with upstanding ears 13 riveted or otherwise secured to the runners and to these ears the tongue-like ends 15 of ferrules 17 are pivotally secured. Upright handle bars 18 are rigidly disposed within the ferrules and are connected across their tops by means of a bar 19 and are also connected between their ends by a transverse bar 20 in such a manner that the handles 18 will be securely connected together. Thus, when the vehicle is being used as a sled the operator by a twisting movement exerted upon the steering device may slightly tilt the runners to cause the sled to be diverted from its straightforward path either to right or left as desired. These handle members, therefore, constitute the sled steering mechanism. The handles 18 and cross bar 19 may also serve as a handhold for one or more passengers or operators who may stand upon the foot rest 21, as will be obvious. The construction and operation of the vehicle so far described may be better understood by reference to my Patent No. 1,458,392 issued June 12, 1923.

The space between the runners rearwardly of the steering handles is entirely unobstructed so that one or more riders standing on the runners or on the footrest 21, if used, may push between the runners, each with his inside foot so that the sled may be propelled without causing it to swerve or be diverted from its course, as might be the case where the propelling foot was used at one side of the sled. In using the sled one or more passengers may stand behind on the runners grasping the cross bar 19 with their hands, while their inside feet are propelling the sled.

For the purpose of transforming the sled into a wheeled vehicle, the runners rearwardly of the handle members and preferably rearwardly of the footrests 21 are drilled to receive stub shafts 22 upon which wheels 23 are mounted and at the forward end a yoke 25 having upwardly projecting arms 26 and 27 is rigidly secured to the runners in any suitable manner, although it may be desired to secure them as illustrated particularly in Fig. 1, wherein the respective arms 26 and 27 engage over the projecting end of the members 4 and are braced by means of a gusset plate, or the like, 28 to the runners. Preferably, this yoke 25 together with its bracing gusset plate 28 is detachably secured to the sled runners in order that they may be removed when it is desired to use the vehicle as a sled. Brackets 29 and 30 are pivotally connected to the horizontal portion of the yoke 25 and suitably secured in these brackets are stub shafts 31 and 33, upon which the front wheels 34 are rotatively secured. The brackets 29 and 30 are each formed with a rearwardly extending projection 35 to each of which a rod 36, extending between them, is pivotally connected. Bracket 30, however, is provided with an integral or rigidly secured projection 37 to which a rod 38 is pivotally connected at one of its ends, its other end being detachably and pivotally connected with a forked crank arm 39 fixedly secured upon a shaft 41. The shaft 41 is preferably journalled in one of the steering handles 18 and may form an integral part of a steering rod or lever 42, at its upper end formed with a ball grip 43.

It will be apparent from the foregoing that by movement of the rod or lever 42 forwardly or rearwardly the crank arm 39 will pull or push the rod 38 and therewith the projection 37 to turn the wheels respectively to the right or to the left as viewed in Fig. 2. The rod 36 being pivotally connected between the projection 35 of the brackets 29 and 30, will accordingly move the wheels in parallel relation in either direction and serves to brace them against movement out of parallel position.

Preferably adjacent the opposite handle 18 I place a flexible rod 44 having an end grip 45 and connected at 46 in pivotal relation with a horizontal brake bar lever 47 formed with bent portions 48 which are pivoted to the ears 13 midway of their length as shown at 49. The lower ends of the bent portions 48 are drilled to receive longitudinally extending rods 51 pivoted at their rear ends to brake lever 52 in turn detachably pivoted to the sled runner at 53. When it is desired to apply the brakes to wheels 23 the operator grasping handle 45 pulls upward on the flexible rod 44 which may be slidably guided through the eyes of screws 50. This upward movement of the rod 44 will tend to pull the brake bar 47 upwardly, turning the bent portions thereof about their pivots 49 and consequently moving the brake 52 about its pivot into frictional engagement with the wheels. A spring 55 is suitably connected between the ferrule 17 and the bent portions 48 of the bar 47 in order to hold it in retracted position when not in use. When the vehicle is being used as a sled the brake rod 51 and the brake 52 are of course removed, and if desired, the pointed corners 54 of the bent portions 58 of the brake bar may be used to brake upon the ice or snow.

The combination sled and wheeled vehicle which I have devised may be transformed within a very few minutes from the sled to wheeled vehicle or vice versa. It is also capable of being knocked down for transportation or for carrying about from place to place conveniently in the manner fully described in my patent above referred to.

From the foregoing it will be apparent that I have provided a sled of unique construction and features, one capable of quick and simple conversion from wheeled vehicle to sled or vice versa, one which will carry two, three or more passengers, one which is peculiarly adapted for children's use, one which may be easily steered in either condition and with the propelling rider in a standing position, and one which can be manufactured economically, assembled readily and transported with convenience.

I have shown and described a preferred embodiment of the invention, but it will be obvious that many details of construction are capable of wide modification and variation without departure from its essence and the scope of the appended claims.

I claim:

1. In a push sled having a pair of runners, a brace connecting said runners at their front ends, steering handles rising from the runners rearward of said brace, a cross bar connecting said handles, a detachable yoke connected to said runners ahead of said handles, and wheels pivotally mounted upon said yoke for steering, a connection between said wheels whereby they may be cooperatively disposed for steering, and a steering lever operatively connected to one wheel and attached to and disposed adjacent one of said handles whereby said sled may be steered as a wheeled vehicle with the operator standing upright to the rear of the handles, said handles and cross-bar providing means whereby said sled may be steered when said wheels are removed.

2. In a push sled having a pair of runners, a brace connecting said runners adjacent their front ends, interconnected sled steering handles rising from said runners intermediately between the front and rear ends thereof, foot rests upon said runners rearward of said handles, and a pair of detachable wheels on each runner, one wheel fore and one wheel aft of said handles, means connecting the two front wheels together including pivots therefor, and a steering lever operatively connected to said means and pivotally secured to one of said handles whereby the operator, standing on said foot rests, may operate said lever to steer said sled when used as a wheeled vehicle.

3. In a push sled having a pair of runners, a brace connecting said runners adjacent their front ends, and sled steering handles interconnected and rising from said runners, wheels attached to each runner fore and aft of said handles, means connecting said fore wheels together and to said runners whereby they may be steered, a steering rod connected to one of said fore wheels, and a steering lever connected to said rod and mounted on one of said steering handles whereby an operator, standing on the runners to the rear of said handles may operate said steering lever to steer the sled when used as a wheeled vehicle.

MARTIN O. CARLSON.